Sept. 17, 1935.  W. L. POLLOCK, JR  2,014,779
BRAKE OR CLUTCH MECHANISM
Filed June 11, 1931   3 Sheets-Sheet 1

Inventor:
William L. Pollock Jr.
By his Attorneys
Edmond Congar Brown
Elizabeth C. Brown Sept. 17, 1935.  W. L. POLLOCK, JR  2,014,779
BRAKE OR CLUTCH MECHANISM
Filed June 11, 1931  3 Sheets-Sheet 2
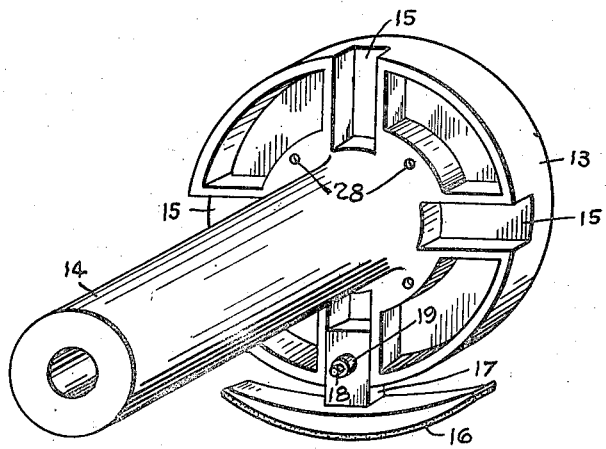
Fig. 4
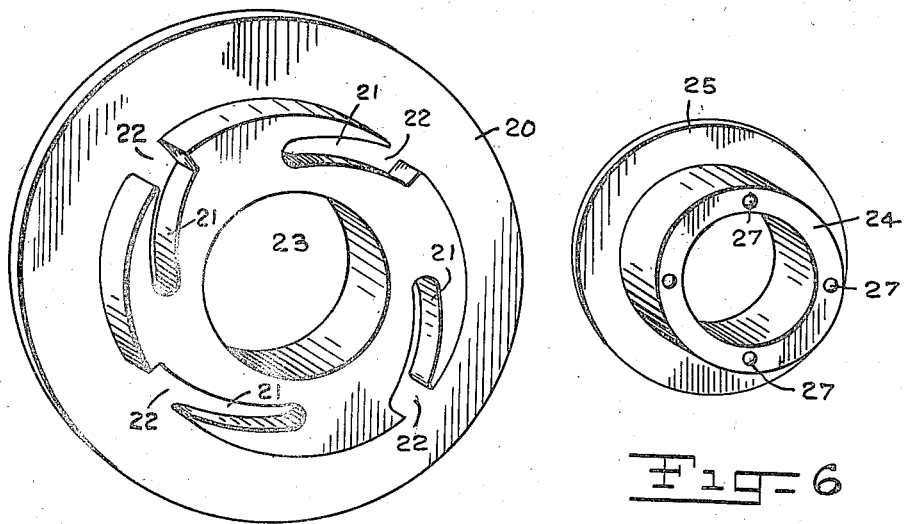
Fig. 5
Fig. 6
Inventor:
William L. Pollock, Jr.
By his Attorneys
Edmond Conger Brown
Elizabeth C. Brown Sept. 17, 1935.         W. L. POLLOCK, JR         2,014,779
                    BRAKE OR CLUTCH MECHANISM
                    Filed June 11, 1931        3 Sheets-Sheet 3

INVENTOR:
William L. Pollock Jr
BY
Edmund Conger Brown
Elizabeth C. Brown
ATTORNEYS Patented Sept. 17, 1935

2,014,779

UNITED STATES PATENT OFFICE 2,014,779

BRAKE OR CLUTCH MECHANISM

William L. Pollock, Jr., New York, N. Y.

Application June 11, 1931, Serial No. 543,597

3 Claims. (Cl. 188—78)

My invention relates to brakes and clutches for vehicles and various types of machinery, and particularly to that class of such devices which may be designated expanding brakes or clutches.

One of the principal objects of my invention is to provide a mechanism of the kind specified which shall be simple and efficient in construction and in which the moving parts and particularly the friction shoes are easily replaceable. Further objects and advantages of my invention will be in part set forth in the following specification, and in part will be obvious therefrom without being specifically pointed out, the same being realized and attained by means of the instrumentalities and structural characteristics and relative arrangements and combinations which will be hereinafter more fully described or which will be pointed out in the claims hereof.

With the above and other objects of the invention in view, the invention consists in the novel construction, arrangement and combination of various devices, elements and parts, as set forth in the claims hereof, certain embodiments of the same being illustrated in the accompanying drawings and described in this specification.

In the accompanying drawings,

Fig. 4 is a perspective view of the inner brake-shoe-bearing member;

Fig. 5 is a perspective view of the grooved plate which operates the brake-shoes;

Fig. 6 is a perspective view of a collar member for controlling the relative position of the brake-shoe-bearing member and the grooved plate, all as hereinafter described.

In carrying my invention into effect in the embodiments thereof which have been selected for illustration in the accompanying drawings and for description in this specification, I provide the various members and parts hereinafter described and assemble the same as hereinafter set forth. The invention consists of six principal or essential parts, together with the various auxiliary connections for holding the essential parts together when assembled and for facilitating the operation of the same. The essential parts are (1) the drum member shown in Fig. 2, and which, when the device is used as a brake, is secured to the inner side of the vehicle wheel; (2) the friction-shoe-supporting member shown in Fig. 4, which when assembled is located within the member shown in Fig. 2; (3) the friction-shoe members shown in Fig. 3, which are slidably carried in suitable sockets in the supporting member last above mentioned; (4) a grooved plate member shown in Fig. 5, which when the device is assembled lies adjacent the friction-shoe-supporting member and the friction-shoes carried thereby; (5) the collar member shown in Fig. 6, which holds the above-mentioned parts assembled; and (6) operating means, one form of which is shown in Fig. 1, for rotating the grooved plate member relatively to the friction-shoe-bearing member and thereby setting or releasing the brakes.

Figure 1:
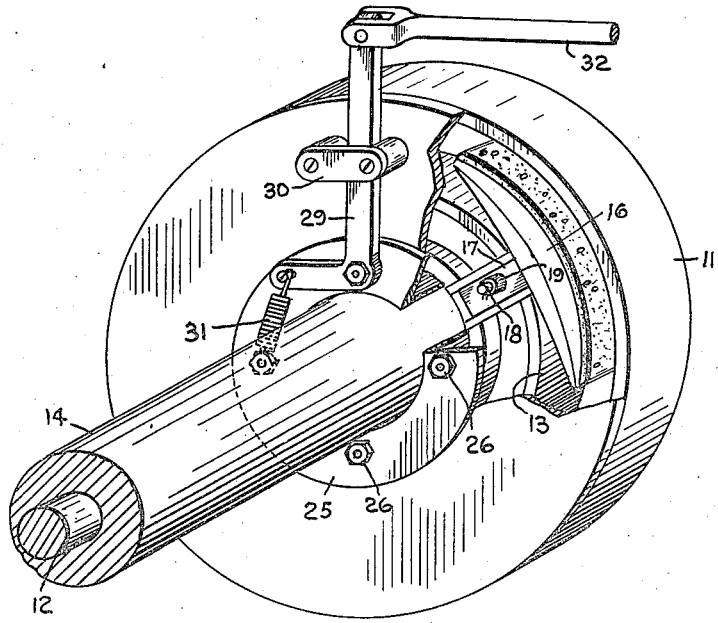
Fig. 1 is a perspective view of a brake mechanism constructed according to my invention, showing the various parts assembled in their operative relation.
Figure 2:
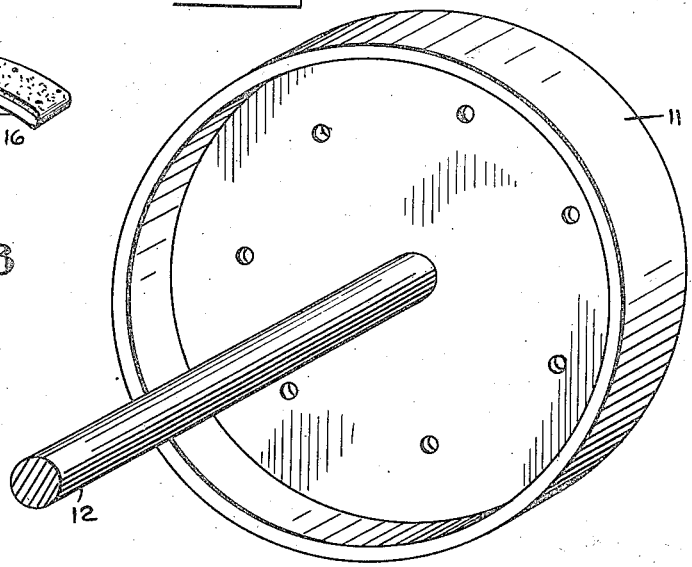
Fig. 2 is a perspective view of the brake drum which is attached to the wheel of the vehicle.

Considering now the form of the invention which is especially adapted for use as a vehicle brake and the like, and referring particularly to Figs. 1 and 2, 11 represents the drum, which is rigidly attached in any suitable manner to the inner side of the vehicle wheel. The numeral 12 represents the axle.

Referring now to Fig. 4, 13 represents the brake-shoe-bearing member, which is secured to or integral with the housing 14, through which, when the device is assembled, passes the axle 12, as shown in Fig. 1. The member 13 is provided with radial sockets 15 which are adapted to receive the brake-shoe members in a way which will be clear from the drawings, one of said members, at the lower part of Fig. 4, being shown in position, the other sockets 15 being shown vacant.

Figure 3:
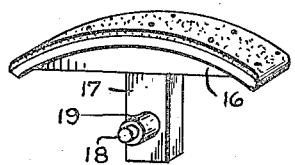
Fig. 3 is a perspective view of one of the brake-shoes.

Referring to Figs. 3 and 4, it will be seen that the brake-shoe member 16 is provided with an inwardly extending stem 17, which bears a laterally projecting pin 18, on which is an anti-friction roller 19.

Referring now to Fig. 5, 20 shows a plate which when the parts are assembled is rotatably secured adjacent on the inside of the parts heretofore described. This plate is provided with a series of grooves 21, each of which is open at the end, as shown at 22 in Fig. 5. The plate is provided with a circular opening 23, which when the parts are assembled fits over the fixed sleeve or housing member 14 (see Fig. 1), having, however, interposed between it and said housing the collar member shown in Fig. 6 and hereafter to be described.

Referring now to Fig. 6, 24 is a collar or sleeve member which when the parts are assembled fits over the housing 14 and through the opening 23 in the grooved plate. The collar 24 is provided with a flange 25 which lies over or inside of the plate 20 when the parts are assembled, as shown in Fig. 1. This collar member is secured, when the parts are assembled, by means of screws 26, which pass through openings 27 in the collar member, as shown in Fig. 6, and into openings 28 in the brake-shoe-supporting member, as shown in Fig. 4. One of these screws 26 is made longer than the others, and serves also to pivotally secure the lever 29, and constitutes the fulcrum thereof, as shown in the upper part of Fig. 1. This lever 29 also passes through a member 30 secured to the grooved plate member 20, as shown in Fig. 1, so that when the upper end of the lever 29 is drawn to the right by the link 32, the member 30 will also be drawn to the right by the lever 29 and will thereby rotate the plate member 20 in a clockwise direction as shown in Fig. 1 (which represents the left-hand rear wheel of a vehicle, viewed from a point between the wheels). The spring 31, secured to a laterally extending toe on said lever, tends to keep said lever, and thereby said plate 20, in the position shown in Fig. 1, in which the brake shoes are out of contact with the drum. The connecting rod or link 32 extends forward and connects with mechanism available to the operator of the vehicle, by means of which the brake may be applied or released.

The manner in which the above-described parts of my invention are assembled, will be clear from what has been already premised with regard to the same, and will be quite well understood by reference to Fig. 1, where all the parts are shown in assembled position and where a portion of the grooved plate is shown broken away. It may be expedient to point out that the pins 18 on the brake-shoes 16, surrounded by their anti-friction rollers 19, lie in the grooves 21 when the parts are assembled, and that the operation of the device consists essentially in the rotation of the grooved plate member 20 with relation to the fixed brake-shoe-bearing member 13. It will readily be seen that as the grooves 21 are inclined with reference to the circular line, the position of the pins 18 in said grooves 21 determines the extent of the protrusion and retrusion of the brake-shoes 16 and consequently the pressure of the same upon the inside surface of the drum 11. When it is desired to apply the brake, the operator moves the link 32 forward, which operates the lever 29, which, by means of the member 30, rotates the grooved plate member 20, thereby causing the brake-shoe pins 18 to move outwardly through the slantingly arranged grooves 21, so that the brake-shoes are brought into a more or less firm contact with the interior of the drum. When it is desired to release the brakes, the lever 29 is allowed to move in a contrary direction, being thereto impelled by the spring 31.

It will be observed by reference to the drawings that the brake-shoes, when the brake is operated, are moved radially outwards and come in immediate contact with the inner surface of the drum 11, that is to say, without the intervention of a friction band, split ring, or other device, as is already known in the prior art.

The operation of my invention will be obvious from what has been above said with regard to the construction and assembly of the different parts.

The advantages of my invention over the forms of such apparatus known to the prior art will also be obvious, and need not be particularly explained here. It may be expedient, however, to call attention to the fact that the grooves 21, which control the radial outward and inward motion of the brake-shoes, are open at their outer ends. It will be seen therefore that the brake-shoes may be removed for the purpose of relining or other repair, by merely turning the brake-shoe-supporting member into such position that the open ends of the grooves 21 register with the open ends of the sockets 15, whereupon the brake-shoes may be removed by merely taking off the wheel with the drum 11. It will also be seen that in a device constructed according to my invention the action of the grooves 21 in releasing as well as applying the brake-shoes is positive, so that there is no danger of the brake-shoes being jammed or bound in contact with the drum when it is desired to release the brakes, but instead the reverse rotation of the brake-shoe-supporting member draws the brake-shoes away from contact with the drum. I might also call attention to the extreme simplicity and the small number of parts comprising my invention, which of course contributes very materially not only to economy of construction but also to efficiency of operation of the same.

I do not limit myself to the particular details of construction set forth in the foregoing specification and illustrated in the accompanying drawings, as the same refer to and set forth only one embodiment of the invention, and it is obvious that the same may be modified, within the scope of the appended claims, without departing from the spirit and scope of the invention, and it is also obvious that the invention is equally well adapted to be operated as clutch mechanism, as for instance in the driving mechanism of automobiles, as well as in various kinds of machinery generally. On Sheet 3 of the drawings, Figs. 7, 8 and 9, I have shown the application of the invention to use as a clutch for operatively connecting together lines of shafting. In these last-mentioned figures, 40 represents one line of shafting and 41 a second line. The shaft 41 is rigidly attached to the drum member 11, and the shaft 40 is rigidly attached to the brake-shoe mechanism hereinbefore fully described, the shaft 40 being analogous to the sleeve 14 shown in Figs. 1 and 4 in that it is connected with the brake-shoe mechanism. In the brake form of the device heretofore described, when the brake-shoes are set, the sleeve 14, which in that modification of the invention is stationary, becomes operatively connected to the drum 11 so that that also becomes stationary. In the present form of the device, however, the shafts 40 and 41 are both rotatable, though one or the other may be stationary provided the brake-shoe mechanism is not set, but upon the brake-shoe mechanism being set, as has been heretofore fully described, the two shafts will obviously rotate together. It is obvious that an analogous modification of the parts will permit the use of the invention as an automobile driving clutch, all of which will be quite obvious to those skilled in the art.

Figure 7:
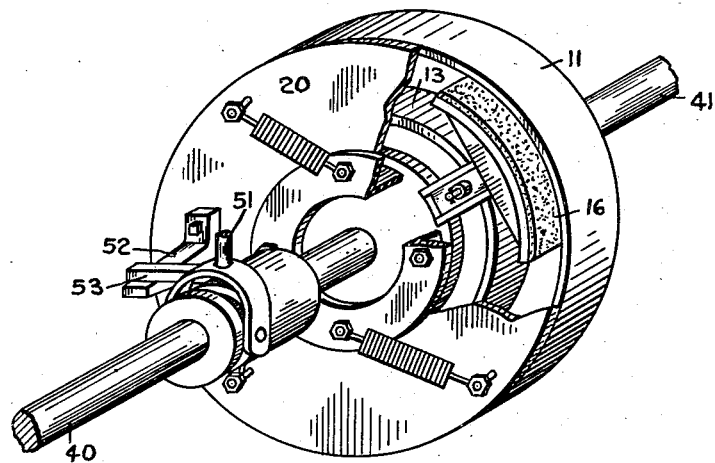
Figs. 7, 8 and 9 are views of a clutch mechanism constructed according to my invention, Fig. 7 being a perspective view and Figs. 8 and 9 views taken at right angles to each other.
Figure 8:
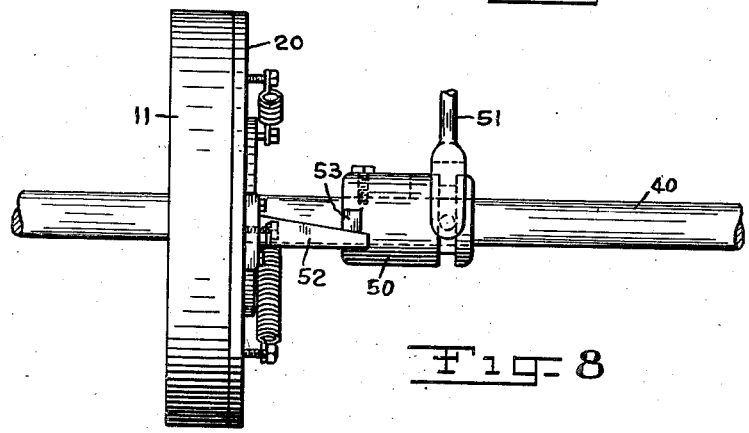
Figure 9:
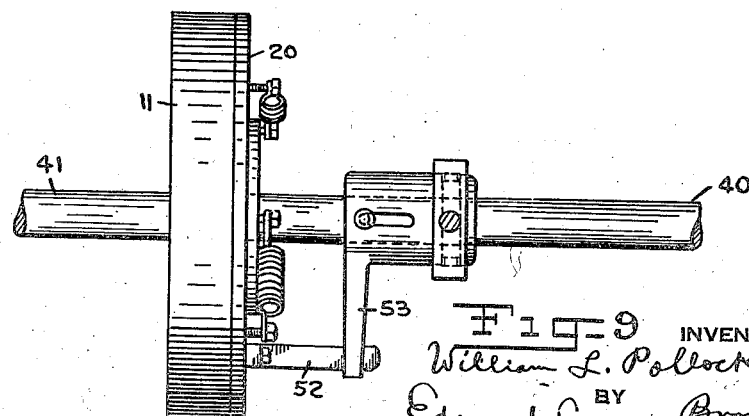

The means by which the shafts 40 and 41 are coupled together, that is to say, the means by which the brake-shoe mechanism is brought into play in this form of the invention, may be of any suitable construction, and as shown in Figs. 7, 8 and 9 the same comprise a sleeve 58 slidable on the shaft 40. The shaft 40, as above explained, is rigid with the brake-shoe bearing member 13 and rotates therewith, independently of the drum 11, when the brake-shoes 16 are not set. Rigid on the brake-shoe-operating member 20 and extending laterally therefrom is an inclined-plane member 52. Laterally extending from the sleeve 50 is an arm 53, which slides upon the inclined plane when the sleeve 50 is moved to the left in Figs. 8 and 9 and rotates the brake-shoe-operating member in a counterclockwise direction, thereby setting the brake-shoes against the internal surface of the drum 11, in a manner which will be well understood. This effect is entirely analogous to the braking action already described with regard to the first form of the invention, but in this case it has the effect of clutching the braking mechanism on the shaft 40 with the inside of the drum on the shaft 41, thereby coupling the said shafts together and causing them to rotate as a single shaft.

Having thus described my invention, what I claim as new and desire to secure by Letters Patent is as follows:

1. In a device of the kind herein referred to, the following elements in combination: a drum the inner surface of which is adapted to react immediately with the friction-shoe member hereinafter mentioned, a friction-shoe-supporting member provided with a radial groove, a friction-shoe-operating member provided with a groove in one face thereof one end of which is nearer to the centre of said operating member than the other end, said friction-shoe-supporting member and said friction-shoe-operating member being located with said grooved faces overlapping each other throughout a substantial proportion of their area and said friction-shoe-operating member forming with the drum a housing for said device, a friction-shoe member slidably mounted in said friction-shoe-supporting member so as to move radially with relation thereto, means on said friction-shoe member adapted to engage with the groove in said friction-shoe-operating member, and means for rotating said friction-shoe-operating member with relation to said friction-shoe-supporting member: whereby when said devices are operated, the friction-shoe member is brought into immediate contact with the inner surface of said drum member when desired and removed from such immediate contact when desired.

2. A device as set forth in the next preceding claim, characterized by the fact that the groove in said friction-shoe-operating member is open at the end more distant from the centre, whereby the engaging means on said friction-shoe member may pass out of said groove without moving from its own plane, thereby permitting a partial disassembling of the device for the purpose of repair or otherwise without entirely disassembling the same.

3. A device as set forth in claim 1, characterized by the fact that said friction-shoe member comprises a friction-shoe proper and an integral stem rigidly attached thereto, said stem being slidably mounted in the radial groove in said friction-shoe-supporting member.

WILLIAM L. POLLOCK, Jr.